(12) United States Patent
Wu

(10) Patent No.: US 11,206,809 B1
(45) Date of Patent: Dec. 28, 2021

(54) FUN PET FEEDER

(71) Applicant: Changli Wu, Linyi (CN)

(72) Inventor: Changli Wu, Linyi (CN)

( * ) Notice: Subject to any disclaimer, the term of this patent is extended or adjusted under 35 U.S.C. 154(b) by 0 days.

(21) Appl. No.: 17/354,073

(22) Filed: Jun. 22, 2021

(30) Foreign Application Priority Data

Dec. 4, 2020 (CN) .......................... 202022901058.7

(51) Int. Cl.
*A01K 5/02* (2006.01)
*A01K 5/01* (2006.01)

(52) U.S. Cl.
CPC .......... *A01K 5/0233* (2013.01); *A01K 5/0114* (2013.01)

(58) Field of Classification Search
CPC ...... A47G 19/32; B65D 83/04; A01K 5/0233; A01K 5/0114
USPC ....... 119/53, 51.11, 52.3, 57.8, 54; 221/190; 222/185.1
See application file for complete search history.

(56) References Cited

U.S. PATENT DOCUMENTS

| | | | | |
|---|---|---|---|---|
| 4,433,641 A * | 2/1984 | Waite | .................. | A01K 5/0225 119/53 |
| 5,360,138 A * | 11/1994 | Zeller | .................... | A47G 19/32 119/53 |
| 5,385,267 A * | 1/1995 | Diamond | ............... | B65D 83/04 221/248 |
| 2009/0095223 A1 * | 4/2009 | Szutu | ...................... | A01K 7/00 119/51.11 |

FOREIGN PATENT DOCUMENTS

WO    WO-2007039779 A1 *   4/2007   ......... B65D 83/0409

\* cited by examiner

*Primary Examiner* — Yvonne R Abbott-Lewis
(74) *Attorney, Agent, or Firm* — McClure, Qualey & Rodack, LLP

(57) ABSTRACT

A fun pet feeder, comprising a shell, a cavity for housing food provided in an upper part of the shell, a food sliding area in a lower part of the shell, a leaky channel capable of being opened and closed between the cavity and the food sliding area, a elastic part in the cavity, a feedstuff outlet provided in a lower part of the cavity, with a lower end of the elastic part resting in the feedstuff outlet, and feedstuff outlet dents provided on the lower end of the elastic part; when the elastic part remains in an initial position, the feedstuff outlet dents are above the feedstuff outlet, the food cannot reach the food sliding area and when the elastic part is pressed and goes downward, the feedstuff outlet dents enter the feedstuff outlet and the feedstuff enters the food sliding area.

10 Claims, 4 Drawing Sheets

FUN PET FEEDER

TECHNICAL FIELD

The present invention relates to pet product field, particularly a fun pet feeder.

BACKGROUND TECHNOLOGY

With growing of living standard, there are more and more families that would like to keep a pet. At present, the main feeding method is only a plate or a bow: putting pet food in the plate or a bowl to allow pet to eat. Most pets are active and naughty, and like to interact with owners. But when the owner is busy or out of home, it is not convenient to bring pets together, so that pets will be lonely at home. Traditional feeding method is boring without any fun and cannot satisfied pet.

SUMMARY OF THE INVENTION

The technical problem that the present invention is to address is to provide a fun pet feeder, to eliminate loneliness of the pets, and also enables pets to get food by themselves when the owners are not at home.

A technical solution adopted by the present invention to address the above mentioned technical problem is a fun pet feeder, characterized in that, comprising a shell, a cavity for housing food is provided in an upper part of the shell, a food sliding area is provided in a lower part of the shell, a leaky channel capable of being opened and closed is provided between the cavity and the food sliding area, an elastic part is provided in the cavity, a feedstuff outlet is provided in a lower part of the cavity, with a lower end of the elastic part resting in the feedstuff outlet, feedstuff outlet dents are provided on the lower end of the elastic part; when the elastic part remains in an initial position, the feedstuff outlet dents are disposed above the feedstuff outlet, and the food cannot pass the feedstuff outlet dents and reach the food sliding area and when the elastic part is pressed and goes downward, the feedstuff outlet dents enter the feedstuff outlet, and the feedstuff enters the food sliding area via the feedstuff outlet dents.

As a further preferred solution of the present invention, a pressing part is provided on a top part of the shell, and the pressing part is connected with the elastic part; when the pet presses the pressing part downwards, the elastic part moves downward, and when the pet releases the pressing part, the elastic part resumes upwards.

As a further preferred solution of the present invention, the elastic part comprises a pillar and springs, wherein the springs are provided in an outer side of the pillar and the pillar is vertically provided in the cavity.

As a further preferred solution of the present invention, a barrier is provided on an upper part of each of the feed outlet dents, and the barrier is to prevent too much feed falling into the feed outlet in one time.

As another further preferred solution of the present invention, the pressing part is provided in a central position at an upper surface of the shell, and a panel surrounding the pressing part inclines down towards the pressing part.

As another further preferred solution of the present invention, the elastic part is provided at a central position of the cavity.

As a further preferred solution of the present invention, a plurality of sliding channels and a plurality of inclined outlet panels are provided in the feed falling area, and the feedstuff slides outwards along the plurality of inclined outlet panels.

As another further preferred solution of the present invention, a plurality of feedstuff openings are provided in the food sliding area, each of the plurality of feedstuff openings are provided at an end of each of the plurality of inclined outlet panels, and the feedstuff is conveyed outside via the plurality of feedstuff openings.

As a further preferred solution of the present invention, pushing blocks for pushing the feedstuff towards the feedstuff outlet dents are provided to an outer side of the elastic part.

As another further preferred solution of the present invention, guiding plates inclining towards the feedstuff outlet are provided at a lower part of the cavity, and the feedstuff outlet is provided at lowermost ends of the guiding plates.

In the present invention, a cavity for housing food is provided in the shell, a food sliding area is provided in a lower part of the shell, and a leaky channel which can be opened and closed is provided between the cavity and the food sliding area, thus when the pet presses an elastic part, wherein feedstuff outlet dents are provided, upward and downward movement of the elastic part in the leaky channel controls opening and closing of the leaky channel so as to control outgoing of the feedstuff. The pet can get food by pressing, which makes it interesting to eat.

DETAILED DESCRIPTION

Figure 1:
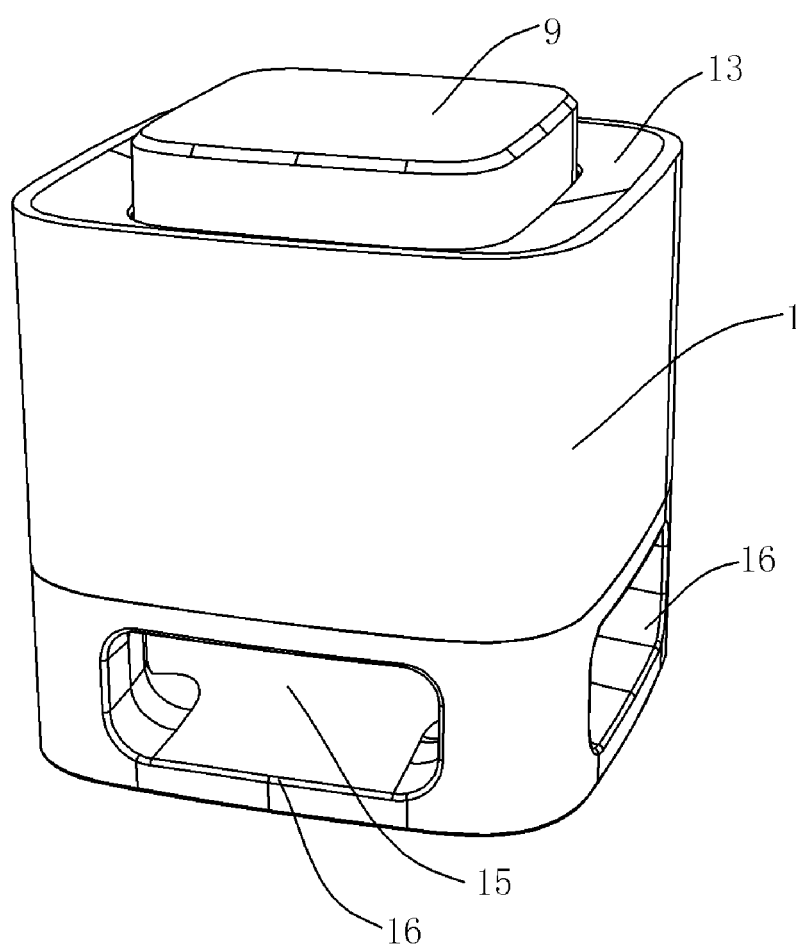
FIG. 1 is a perspective view of the fun pet feeder according to the present invention.
Figure 2:
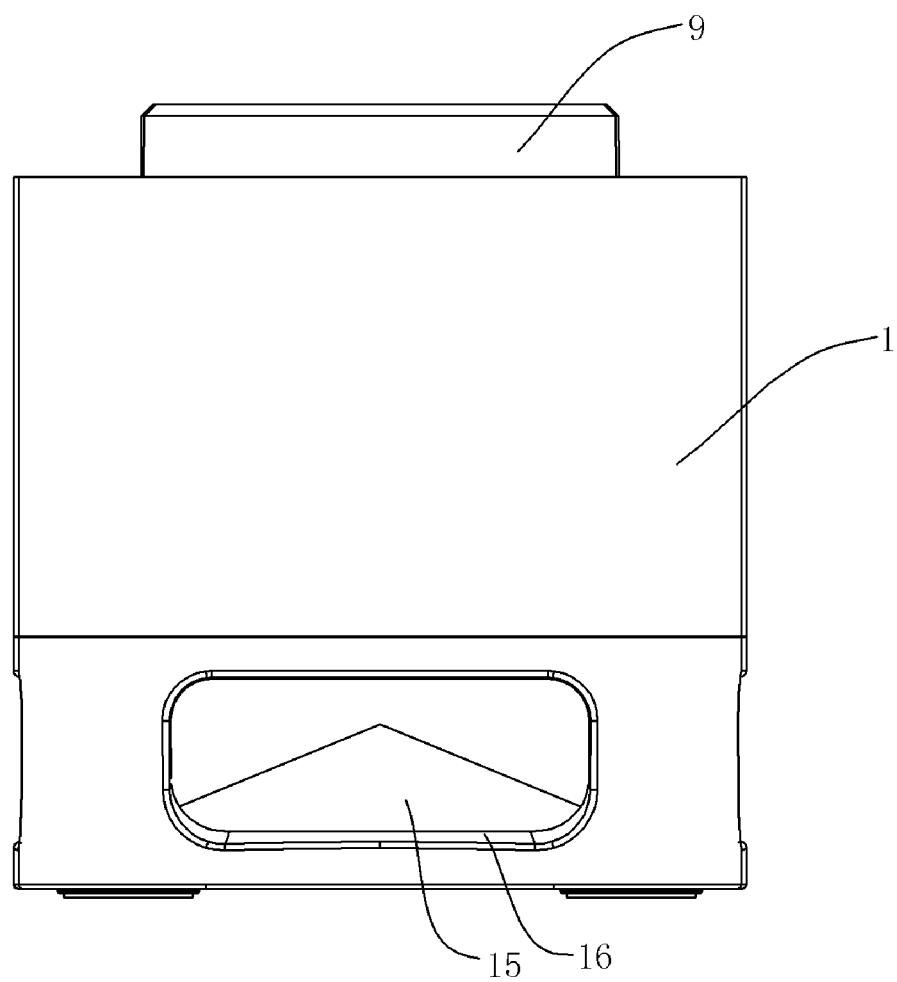
FIG. 2 is a side view of the fun pet feeder according to the present invention.

Hereinafter a further detailed description will be given to the present invention with reference to the accompanying drawings and embodiments.

As is shown in FIG. 1 to FIG. 4, a fun pet feeder, comprises a shell 1, wherein the shell 1 can be made from plastic; a cavity 3 for housing food 2 is provided in an upper part of the shell 1, and the food 2 is enclosed in the cavity 3; a food sliding area 4 is provided at a lower part of the shell 1; a leaky channel 5 that can be opened and closed is provided between the cavity 3 and the food sliding area 4, and the food 2 passes the leaky channel 5 to the food sliding area 4; an elastic part 6 is provided in the cavity 3, wherein flexibility of the elastic part 6 is provided by springs 11; a feedstuff outlet 7 is provided at a lower part of the cavity 3, with a lower end of the elastic part 6 resting in the feedstuff outlet 7, and feedstuff outlet dents 8 are provided at the lower end of the elastic part 6; when the elastic part 6 is in an initial position, the feedstuff outlet dents 8 are immediately above the feedstuff outlet 7, so the leaky channel is closed, and the food cannot enter the food sliding area 4 through the feedstuff outlet dents 8; and when the elastic part 6 is pressed and goes downwards, the feedstuff outlet dents 8 enter the feedstuff outlet 7, so the leaky channel is opened, and the food can enter the food sliding area 4 via the feedstuff outlet dents 8. By pressing the elastic part 6, the pet can get feedstuff, which makes pet feeding interesting.

Figure 3:
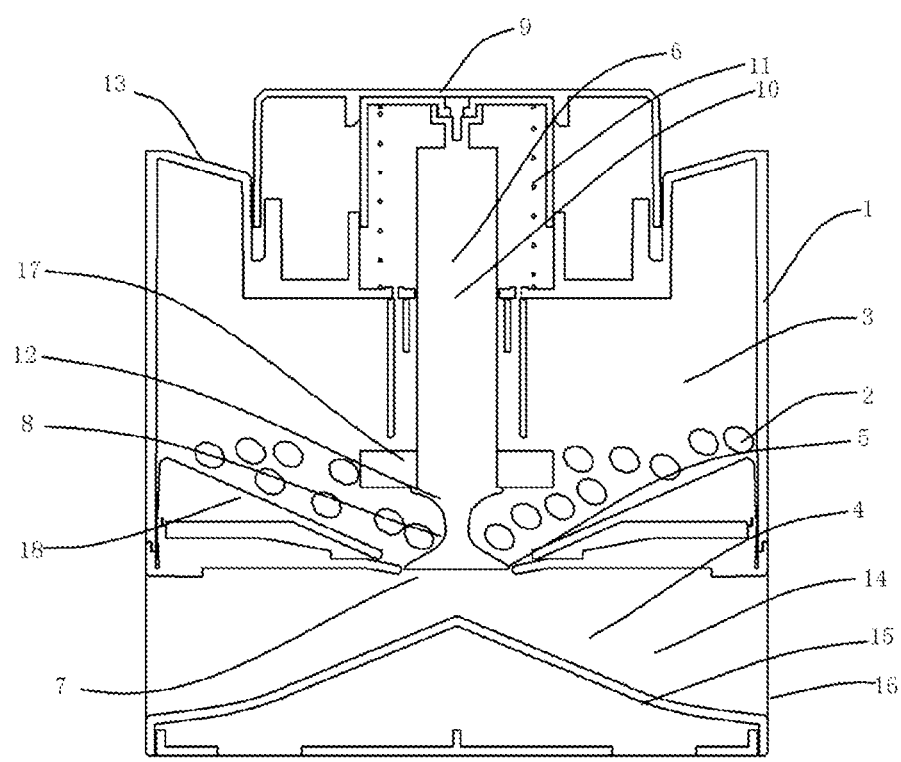
FIG. 3 is a structural view of the fun pet feeder with the leaky channel closed.
Figure 4:
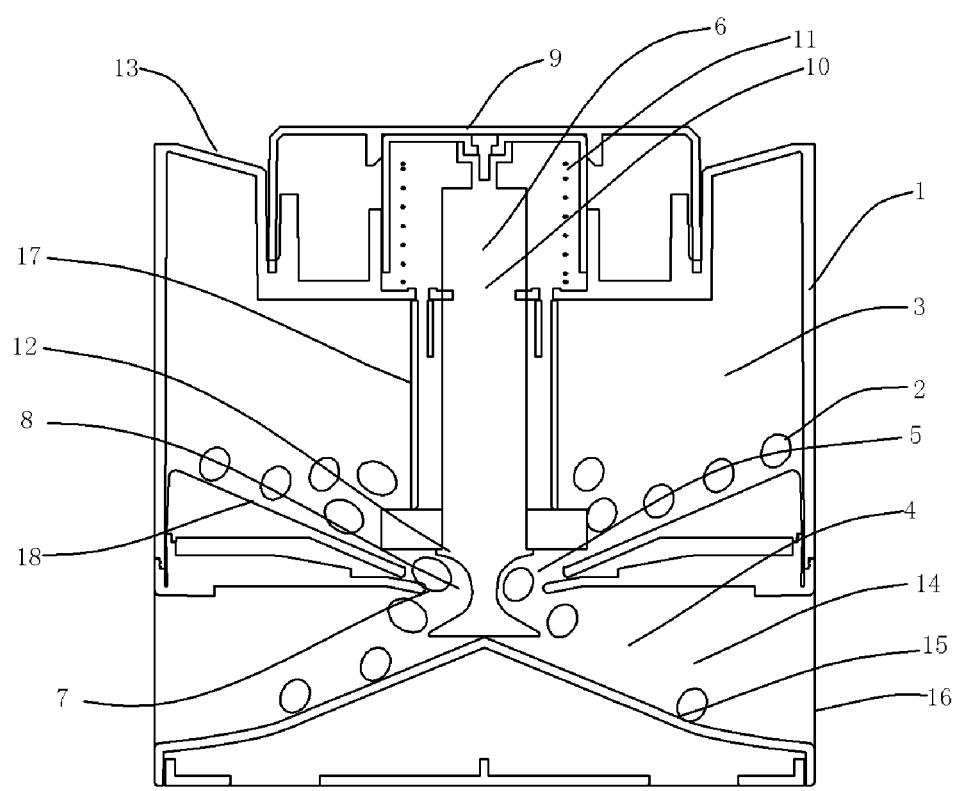
FIG. 4 is a structural view of the fun pet feeder with the leaky channel opened.

As is shown in FIG. 3 and FIG. 4, a pressing part 9 is provided on an upper part of the shell 1, and the pressing part 9 is connected with the elastic part 6; and when the pet presses the pressing part 9, the elastic part 6 goes down, and when the pet releases the pressing part 9, the elastic part 6 resumes to the initial position. The elastic part 6 comprises a pillar 10 and springs 11, the springs 11 are provided to an outer side of the pillar 10, and the pillar 10 is vertically provided in the cavity 3. In this manner, the elastic part 6 can be resumed to the initial position, for the pet to repeat pressing and releasing operations. A barrier 12 is provided in an upper part of each of the feedstuff outlet dents 8, and the barrier 12 is configured to prevent too much feedstuff from entering the feed outlet 7 in one time, which may result in waste of the feedstuff. The pressing part 9 is provided at a central position on an upper surface of the shell 1, and by providing the pressing part 9 in the central position; the pet can easily press the pressing part 9. A panel 13 surrounding the pressing part 9 is provided to be inclining towards the pressing part 9, and with the inclining panel 13, the pet is led to press the pressing part 9. The elastic part 6 is vertically provided in a central position of the cavity 3 and engagement portions of the feedstuff outlet dents 8 and the feedstuff outlet 7 are provided in the central position of the cavity 3 too, in this way, the feedstuff 2 inside the cavity 3 can fall into the feedstuff outlet 7 uniformly. A plurality of sliding channels 14 and a plurality of sliding boards 15 are provided in the food sliding area 4, so the feedstuff 2 slides outwards along the plurality of sliding boards 15, and falling feedstuff 2 slides outwards automatically. A plurality of feedstuff openings 16 are provided in the food sliding area 4, each of the plurality of feedstuff openings 16 is provided in a tail end of each of the sliding boards 15, and the feedstuff is conveyed outside along the sliding boards 15 through the plurality of feedstuff openings 16. The plurality of feedstuff openings 16 are provided to be four, respectively provided at circumferential sides of the shell 1. Pushing blocks 17 for pushing the feedstuff into the feedstuff outlet dents 8 are provided at an outer side of the elastic part 6, to prevent the feedstuff from being stuck in upper sides of the feedstuff outlet dents 8. Guiding plates 18 inclining towards the feedstuff outlet 7 are provided in a lower part of the cavity 3, and the feedstuff outlet 7 is provided at lowermost parts of the guiding plates 18, to promise all feedstuff 2 can enter the feedstuff outlet 7 along the guiding plates 18.

In the foregoing paragraphs, a detailed introduction is given to the fun pet feeder provided in the present invention, while some examples are used to describe principles and embodiments of the present invention, the description given to the examples is only intended to help understanding the present invention and core spirit thereof. It shall be noted that, for those of ordinary skill in the art, it is possible to make some improvements and modifications to the present invention without departing from principles of the present invention and all these improvements and modifications fall into protection scope of the present invention.

The invention claimed is:

1. A fun pet feeder, characterized in that, comprising a shell, a cavity for housing food is provided in an upper part of the shell, a food sliding area is provided in a lower part of the shell, a leaky channel capable of being opened and closed is provided between the cavity and the food sliding area, a elastic part is provided in the cavity, a feedstuff outlet is provided in a lower part of the cavity, with a lower end of the elastic part resting in the feedstuff outlet, feedstuff outlet dents are provided on the lower end of the elastic part; when the elastic part remains in an initial position, the feedstuff outlet dents are disposed above the feedstuff outlet, and the food cannot pass the feedstuff outlet dents and reach the food sliding area and when the elastic part is pressed and goes downward, the feedstuff outlet dents enter the feedstuff outlet, and the feedstuff enters the food sliding area via the feedstuff outlet dents.

2. The fun pet feeder according to claim 1, characterized in that, a pressing part is provided on a top part of the shell, and the pressing part is connected with the elastic part; when the pet presses the pressing part downwards, the elastic part moves downward, and when the pet releases the pressing part, the elastic part resumes upwards.

3. The fun pet feeder according to claim 1, characterized in that, the elastic part comprises a pillar and springs, wherein the springs are provided in an outer side of the pillar and the pillar is vertically provided in the cavity.

4. The fun pet feeder according to claim 1, characterized in that, a barrier is provided on an upper part of each of the feed outlet dents, and the barrier is to prevent too much feed falling into the feed outlet in one time.

5. The fun pet feeder according to claim 2, characterized in that, the pressing part is provided in a central position at an upper surface of the shell, and a panel surrounding the pressing part inclines down towards the pressing part.

6. The fun pet feeder according to claim 1, characterized in that, the elastic part is provided at a central position of the cavity.

7. The fun pet feeder according to claim 1, characterized in that, a plurality of sliding channels and a plurality of inclined outlet panels are provided in the feed falling area, and the feedstuff slides outwards along the plurality of inclined outlet panels.

8. The fun pet feeder according to claim 7, characterized in that, a plurality of feedstuff openings are provided in the food sliding area, each of the plurality of feedstuff openings are provided at a tail end of each of the plurality of inclined outlet panels, and the feedstuff is conveyed outside via the plurality of feedstuff openings.

9. The fun pet feeder according to claim 1, characterized in that, pushing blocks for pushing the feedstuff towards the feedstuff outlet dents are provided to an outer side of the elastic part.

10. The fun pet feeder according to claim 1, characterized in that, guiding plates inclining towards the feedstuff outlet are provided at a lower part of the cavity, and the feedstuff outlet is provided at lowermost ends of the guiding plates.

* * * * *